(12) United States Patent
Pedrini

(10) Patent No.: US 7,648,151 B2
(45) Date of Patent: Jan. 19, 2010

(54) BICYCLE SUPPORT WITH PIVOTING WHEEL ENGAGEMENT MEMBER

(76) Inventor: Fabio Pedrini, Via Boccherini 24/2°, Casalecchio di Reno 40033 (Bologna) (IT)

( * ) Notice: Subject to any disclaimer, the term of this patent is extended or adjusted under 35 U.S.C. 154(b) by 575 days.

(21) Appl. No.: 11/421,162

(22) Filed: May 31, 2006

(65) Prior Publication Data

US 2006/0273126 A1 Dec. 7, 2006

Related U.S. Application Data

(60) Provisional application No. 60/685,949, filed on May 31, 2005.

(51) Int. Cl.
*B62K 27/12* (2006.01)
*B60R 9/00* (2006.01)
(52) U.S. Cl. .................. 280/292; 280/293; 224/495; 414/462
(58) Field of Classification Search ............ 224/419, 224/495, 496, 498, 502, 509, 519; 280/288.4, 280/292, 293, 402; 414/462
See application file for complete search history.

(56) References Cited

U.S. PATENT DOCUMENTS

| 488,395 | A | 12/1892 | Justice |
| 529,827 | A | 11/1894 | Fonda |
| 556,789 | A | 3/1896 | Walker |
| 576,351 | A | 2/1897 | Penfield |
| 586,681 | A | 7/1897 | Douglas |
| 607,024 | A | 7/1898 | Durfee et al. |
| 615,264 | A | 12/1898 | Du Pont |
| 623,807 | A | 4/1899 | Myers |
| 1,179,823 | A | 4/1916 | Greene |
| 1,912,958 | A | 6/1933 | Widener |
| 1,977,734 | A | 10/1934 | Monckmeier |
| 2,179,163 | A | 11/1939 | Roth |
| 2,944,811 | A * | 7/1960 | Wolf .......................... 269/152 |
| 3,251,520 | A | 5/1966 | Van Dyke et al. |
| 3,529,737 | A | 9/1970 | Daugherty |
| 3,744,689 | A | 7/1973 | Kjensmo |
| 3,853,255 | A * | 12/1974 | Spencer ..................... 224/537 |
| 3,891,132 | A | 6/1975 | Chandler |

(Continued)

FOREIGN PATENT DOCUMENTS

DE 4330019 3/1995

(Continued)

*Primary Examiner*—Lesley D Morris
*Assistant Examiner*—Marc A Scharich
(74) *Attorney, Agent, or Firm*—Boyle Fredrickson, S.C.

(57) ABSTRACT

A support for a bicycle having a front wheel and a rear wheel includes a frame and a trough-shaped support including a pivoting wheel engagement section pivotably mounted to the frame in a first location for movement about a pivot axis between a loading position and a support position. The pivoting wheel engagement section engages a portion of an outer periphery defined by a first one of the bicycle wheels, and faces upwardly to receive the bicycle wheel when the wheel engagement section is in the loading position and faces laterally when the wheel engagement section is in the support position. A second wheel engagement member is mounted to the support frame in a second location spaced from the first location, and is configured to engage a second bicycle wheel when the wheel engagement section is engaged with the first bicycle wheel in the support position.

16 Claims, 13 Drawing Sheets

U.S. PATENT DOCUMENTS

| | | | |
|---|---|---|---|
| 3,972,456 A | 8/1976 | Saffold | |
| 3,993,229 A | 11/1976 | Summers | |
| 4,088,253 A | 5/1978 | Saffold | |
| 4,125,214 A | 11/1978 | Penn | |
| 4,171,077 A | 10/1979 | Richard, Jr. | |
| 4,193,526 A * | 3/1980 | Rosmarinofski | 224/401 |
| 4,213,729 A | 7/1980 | Cowles et al. | |
| 4,360,135 A | 11/1982 | Goble | |
| 4,403,716 A | 9/1983 | Carlson et al. | |
| 4,437,597 A | 3/1984 | Doyle | |
| 4,524,893 A | 6/1985 | Cole | |
| 4,702,401 A | 10/1987 | Graber et al. | |
| 4,767,037 A * | 8/1988 | DeLellis | 224/571 |
| 4,815,638 A | 3/1989 | Hutyra | |
| 4,823,997 A | 4/1989 | Krieger | |
| 4,875,608 A | 10/1989 | Graber | |
| 4,877,169 A | 10/1989 | Grim | |
| 5,029,740 A | 7/1991 | Cox | |
| 5,123,802 A * | 6/1992 | Bell | 414/563 |
| 5,169,042 A | 12/1992 | Ching | |
| 5,228,712 A * | 7/1993 | Speier | 280/401 |
| 5,445,300 A | 8/1995 | Eipper et al. | |
| 5,497,927 A | 3/1996 | Peterson | |
| 5,549,231 A * | 8/1996 | Fletcher et al. | 224/536 |
| 5,570,825 A | 11/1996 | Cona | |
| 5,579,973 A | 12/1996 | Taft | |
| 5,624,063 A | 4/1997 | Ireland | |
| 5,692,659 A | 12/1997 | Reeves | |
| 5,709,521 A | 1/1998 | Glass et al. | |
| 5,730,343 A | 3/1998 | Settelmayer | |
| 5,794,828 A | 8/1998 | Colan et al. | |
| 5,833,074 A | 11/1998 | Phillips | |
| 5,845,828 A | 12/1998 | Settelmayer | |
| 5,906,386 A * | 5/1999 | Baker et al. | 280/404 |
| 5,988,403 A | 11/1999 | Robideau | |
| 6,010,048 A | 1/2000 | Settelmayer | |
| 6,053,336 A | 4/2000 | Reeves | |
| 6,089,430 A | 7/2000 | Mehls | |
| 6,099,012 A * | 8/2000 | Mortimer | 280/402 |
| 6,149,039 A | 11/2000 | Englander | |
| 6,164,508 A | 12/2000 | van Veenen | |
| 6,460,743 B2 | 10/2002 | Edgerly et al. | |
| 6,523,731 B1 | 2/2003 | Pedrini | |
| 6,561,398 B1 * | 5/2003 | Cole et al. | 224/324 |
| 6,736,301 B1 * | 5/2004 | Huang | 224/500 |
| 6,761,297 B1 | 7/2004 | Pedrini | |
| 7,240,816 B2 * | 7/2007 | Tsai | 224/501 |
| 2003/0160423 A1 * | 8/2003 | Heerspink | 280/293 |

FOREIGN PATENT DOCUMENTS

| | | |
|---|---|---|
| DE | 19934384 | 1/2001 |
| GB | 767553 | 2/1957 |
| SE | 97617 | 12/1939 |
| SE | 104714 | 6/1942 |
| WO | WO 03/006277 | 1/2003 |

* cited by examiner

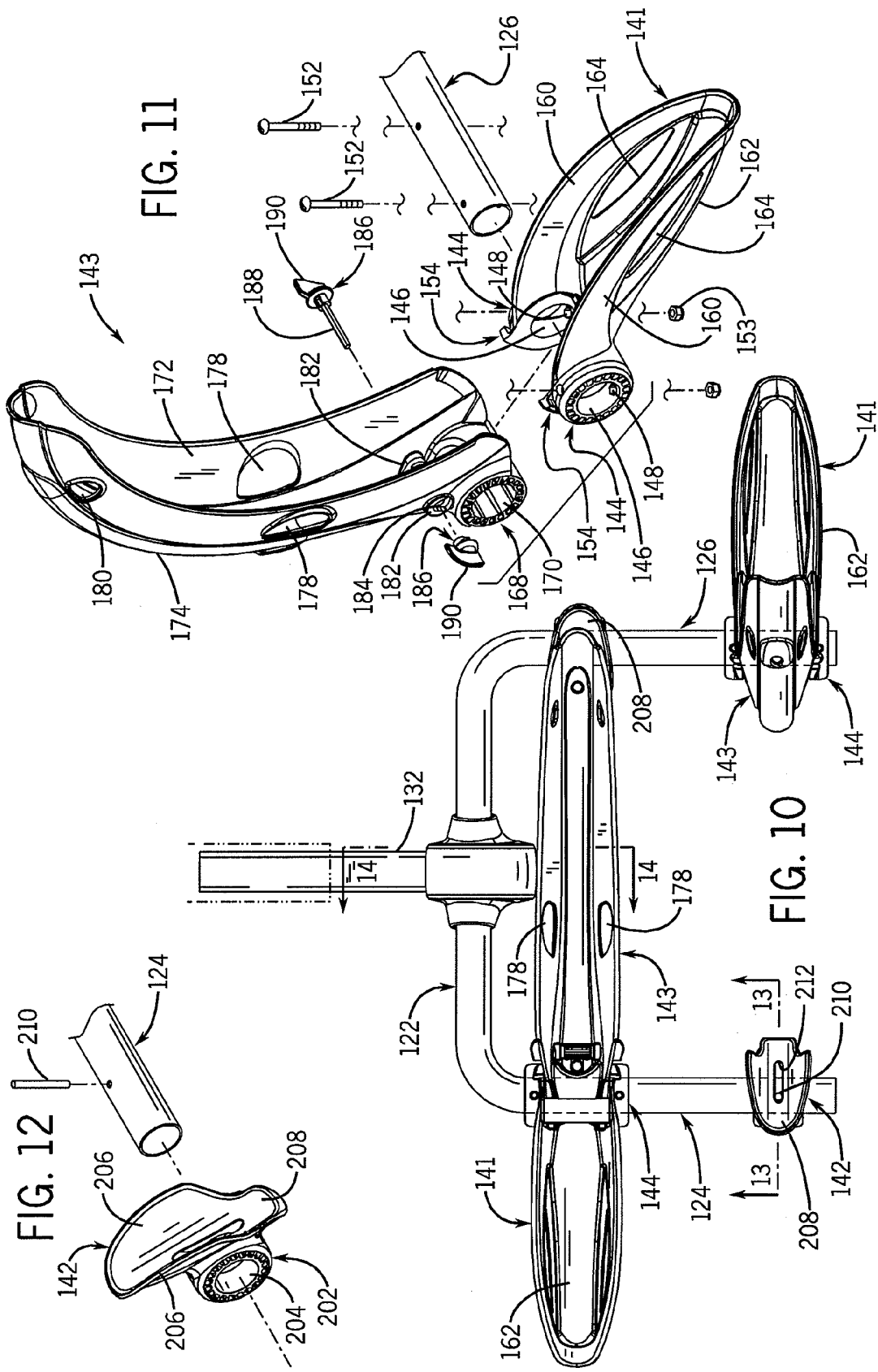

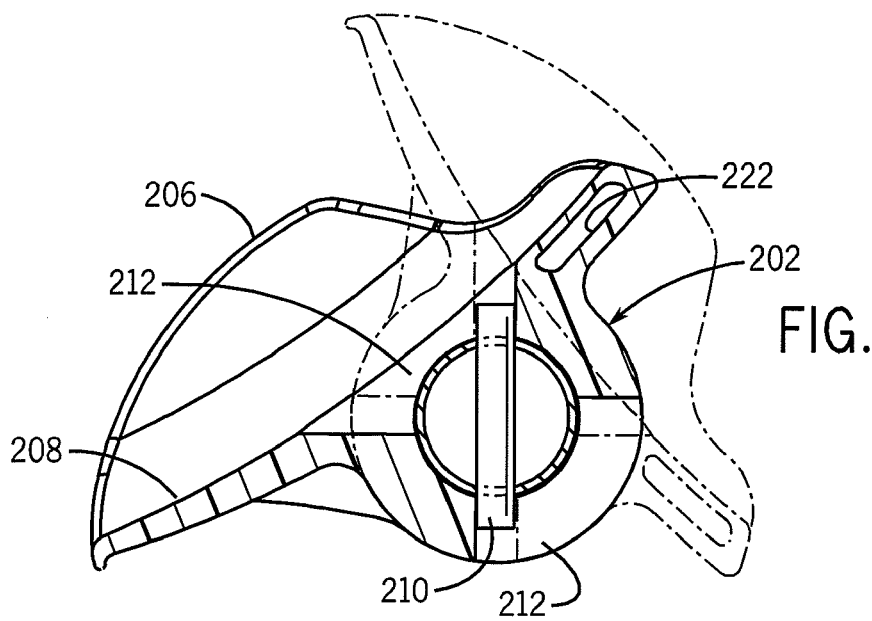
FIG. 13
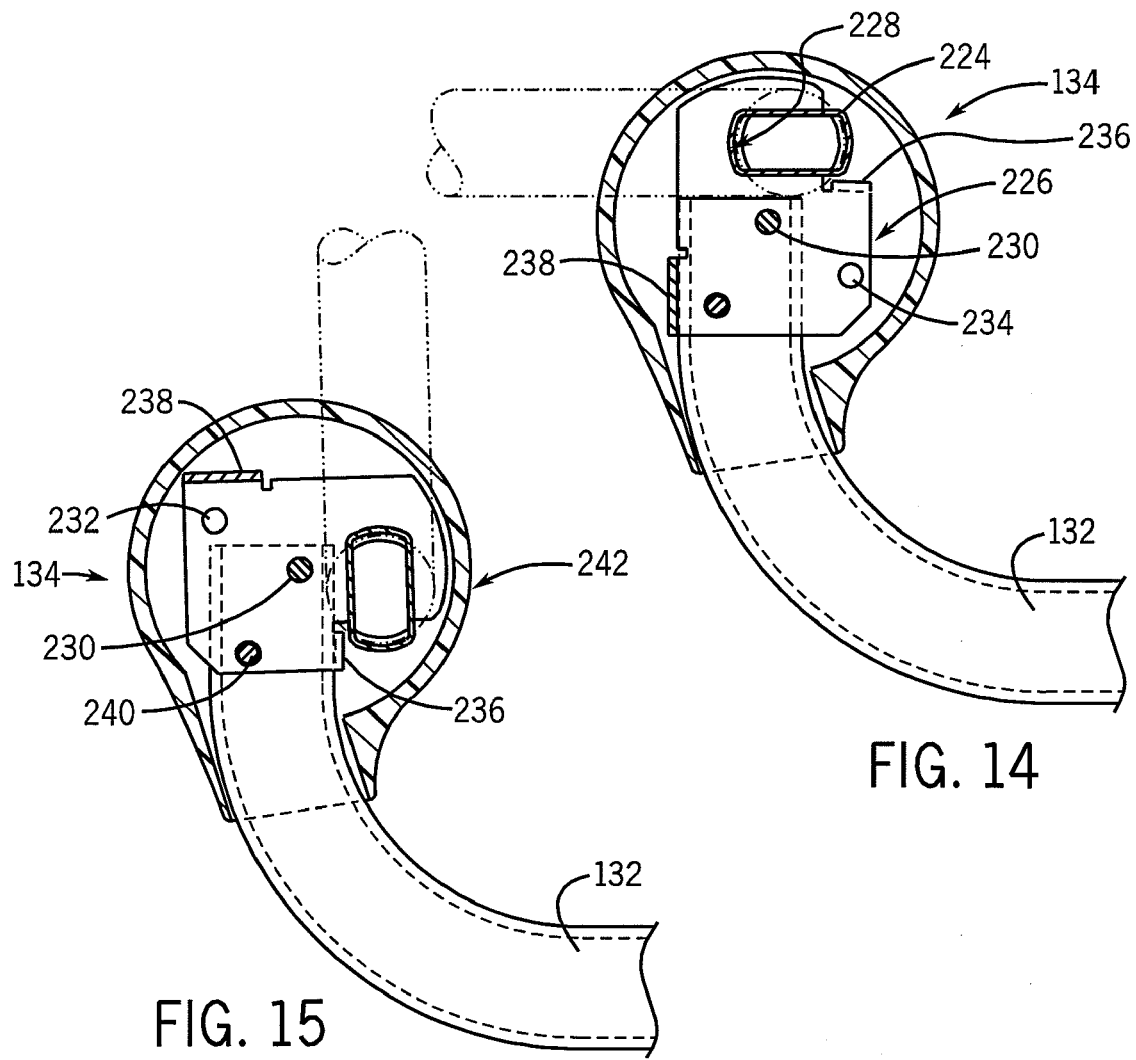
FIG. 14
FIG. 15

BICYCLE SUPPORT WITH PIVOTING WHEEL ENGAGEMENT MEMBER

CROSS-REFERENCE TO RELATED APPLICATION

This application claims the benefit of U.S. Provisional Application Ser. No. 60/685,949, filed May 31, 2005.

BACKGROUND AND SUMMARY OF THE INVENTION

This invention relates to a support for a wheeled device such as a bicycle or the like, such as for use in connection with a vehicle-mounted carrier or a parking arrangement.

There are a wide variety of carrier configurations for securing wheeled devices, such as bicycles, to a vehicle. One design is a fork mount, which requires the user to remove the bicycle front wheel and use the fork of the bicycle for securement and stabilization. This design is acceptable, but requires the user to remove and replace the bicycle wheel and to store the wheel during transport. Another design utilizes the frame of the bicycle to support the bicycle on the carrier in a suspension-type manner. There are a wide variety of carriers of this type. A common limitation to all such carriers is that the carrier may not be able to support certain types of uniquely configured bicycle frames. Suspension-type carriers also require the use of stabilizers or the like to prevent the suspended bicycles from swinging during movement of the vehicle. Stabilizers add cost to the carrier, and are sometimes unable to provide the degree of restraint that is required in order to prevent swinging movement of the bicycles during transport, such that one carrier cannot be used to support frames having different configurations. Tray-type carriers typically support the bicycle using the bicycle wheels, without engagement with the frame. Carriers of this type are easy to use in that the bicycle is simply placed on the carrier. An example of a tray-type bicycle carrier is shown and described in Pedrini U.S. Pat. No. 6,761,297 issued Jul. 13, 2004, the disclosure of which is hereby incorporated by reference. The '297 patent discloses a carrier in which one of the bicycle wheels is engaged with a pair of pivoting wheel supports that are configured to support the bicycle wheel from below. The other bicycle wheel rests on a support spaced from the pivoting wheel supports. An extendible and retractable arm engages an upper area of the wheel that is supported by the pivoting supports, and applies a downward force on the wheel to essentially clamp the wheel against the pivoting wheel supports, to secure the bicycle to the carrier. A commercial embodiment of a carrier of this type is available from Saris Cycling Group, Inc. of Madison, Wis. under the designation CYCLE-ON. This type of carrier avoids the need remove a bicycle wheel or to engage the bicycle frame, in order to support the bicycle on the carrier. However, the extendible and retractable arm associated with this type of carrier involves a mechanism that adds a certain amount of cost and complexity to the carrier, which thus affects the price of the carrier and also requires maintenance and repair to ensure operability of the arm.

In a bicycle parking application, a typical stationary support for a wheeled device such as a bicycle involves a frame or the like that includes a number of open spaces, each of which is configured to receive a bicycle wheel. The frame includes a pair of cross-members that prevent the wheel from rolling when the wheel is received within one of the spaces, to maintain the bicycle in an upright orientation.

It is an object of the present invention to provide a support for a wheeled device such as a bicycle, which can be used in either a vehicle-mounted carrier application or in a stationary parking application. It is another object of the invention to provide such a support that is configured to maintain the wheeled device in an upright orientation by engagement with the wheels of the wheeled device, without the need for an extendible and retractable arm or other mechanism as in the prior art. It is a further object of the present invention to provide such a support that is capable of enabling the wheeled device to be quickly and easily placed on and secured to the support. Yet another object of the invention is to provide such a support which is relatively simple in its components and assembly, which thus enables the device to be manufactured at a relatively low cost to enhance affordability of the support. A still further object of the invention is to provide such a support that can be placed in an operative position for use and in an inoperative position when not in use, to minimize the space occupied by the support. A still further object of the invention is to provide such a support that is versatile so as to be capable of supporting bicycles of different sizes and configurations.

In accordance with one aspect, the invention contemplates a support for a wheeled device, such as a bicycle having a front wheel and a rear wheel, including a support frame and a first wheel engagement member pivotably mounted to the support frame in a first location for movement about a pivot axis between an lowered inoperative position and a raised support position. The first wheel engagement member is configured to engage a portion of an outer periphery defined by a first one of the bicycle wheels. The wheel engagement member faces upwardly when in the lowered inoperative position, and faces laterally when in the raised support position. The support further includes a second wheel support or engagement member mounted to the support frame in a second location spaced from the first location. The second wheel support member is configured to engage a second one of the bicycle wheels when the first wheel engagement member is engaged with the first bicycle wheel in the support position. The first bicycle wheel may be engaged with the wheel engagement member while the first wheel engagement member is in the lowered inoperative position, and the first wheel engagement member may then be pivoted to the raised support position. Alternatively, the first bicycle wheel may be engaged with the wheel engagement member after the first wheel engagement member has been moved from the lowered inoperative position to the raised support position. A first support member is interconnected with the support frame at the first location, and is configured to support the first bicycle wheel from below when the first wheel engagement member is in the support position. Representatively, the first wheel engagement member and the first wheel support member are in the form of arcuate trough members defining trough walls configured to receive and engage the first bicycle wheel. A strap arrangement may be used to secure the first and second bicycle wheels to the respective first and second wheel engagement members. The bicycle support may form a part of a vehicle-mounted bicycle carrier, or may be used in a stationary bicycle parking arrangement.

The bicycle support may include multiple pairs of first and second wheel engagement and support members for supporting multiple bicycles. In one embodiment, the bicycle support includes a frame and at least a pair of front wheel supports mounted to the frame, each of which is configured to engage and support the front wheel of a bicycle. At least a pair of rear wheel supports are mounted to the frame, and each is configured to engage and support the rear wheel of a bicycle. The frame, the front wheel supports and the rear wheel supports are configured such that the bicycle front wheels are turned relative to the bicycle frames to prevent contact between the handlebars of an adjacent pair of bicycles. As summarized previously, each front wheel support may be in the form of a trough member that is pivotably mounted to the frame for movement between a lowered inoperative position and a laterally facing support position. In another embodiment, the frame, the front wheel supports and the rear wheel supports are configured such that each front wheel support is located adjacent a rear wheel support. In this manner, the bicycles are mounted to the frame so as to face in opposite directions, in order to prevent contact between the handlebars of an adjacent pair of bicycles.

In accordance with another aspect, the invention contemplates a method of supporting a bicycle having a front wheel and a rear wheel. The method includes engaging a first wheel of the bicycle with a first wheel engagement member pivotably mounted to a support frame in a first location for movement about a pivot axis between a lowered inoperative position and a raised support position. The wheel engagement member faces upwardly when in the lowered inoperative, and is configured to engage a portion of an outer periphery defined by the first bicycle wheel. The method further includes engaging a second wheel of the bicycle with a second wheel engagement member at a second location spaced from the first location when the first wheel support member is in the support position. The method also involves supporting the first wheel from below via a first wheel support member when the first wheel engagement member is in the support position.

The invention also contemplates a support for a bicycle having first and second wheels, including an a primary wheel support configured to receive and engage the first bicycle wheel, which includes a pivoting engagement section that is pivotable about a pivot axis from an upwardly facing receiving position to a laterally facing support position. A portion of the primary support underlies the first bicycle wheel when the pivoting engagement section is in the support position. A secondary wheel support is configured to support the second bicycle wheel when the pivoting engagement section of the primary support is in the support position. The primary support and the secondary support may be carried by a frame configured for engagement with a vehicle, or may be interconnected with a stationary bicycle parking structure. The primary support may be oriented non-perpendicular to the pivot axis so that, when the first bicycle wheel is engaged with the trough member, the first bicycle wheel is oriented in a plane that is non-perpendicular to the pivot axis. The primary support and the secondary support are preferably configured such that a portion of the pivoting engagement section of the primary support is located adjacent the secondary support when the pivoting engagement section is in the upwardly facing inoperative position. A retainer arrangement releasably secures the portion of the pivoting engagement section of the primary support to the secondary support, to maintain the pivoting engagement section in the upwardly facing inoperative position.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 10 is a top plan view of the wheeled device support of FIG. 1, showing one of the wheel engagement members in the laterally facing support position and another of the wheel engagement members in the upwardly facing inoperative position;

FIG. 11 is a partial exploded isometric view illustrating a primary wheel support incorporated into the wheeled device support of FIG. 1, showing a pivotable wheel engagement members and a stationary wheel support members incorporated in the primary wheel support;

FIG. 12 is a partial isometric view illustrating a secondary wheel support incorporated into the wheeled device support of FIG. 1;

FIG. 13 is a partial section view taken along line 13-13 of FIG. 10;

FIG. 14 is a partial section view taken along line 14-14 of FIG. 10, showing the support in a lowered, horizontal operative position;

FIG. 15 is a view similar to FIG. 14, showing the support in a raised, vertical inoperative position;

DETAILED DESCRIPTION

Figure 1:
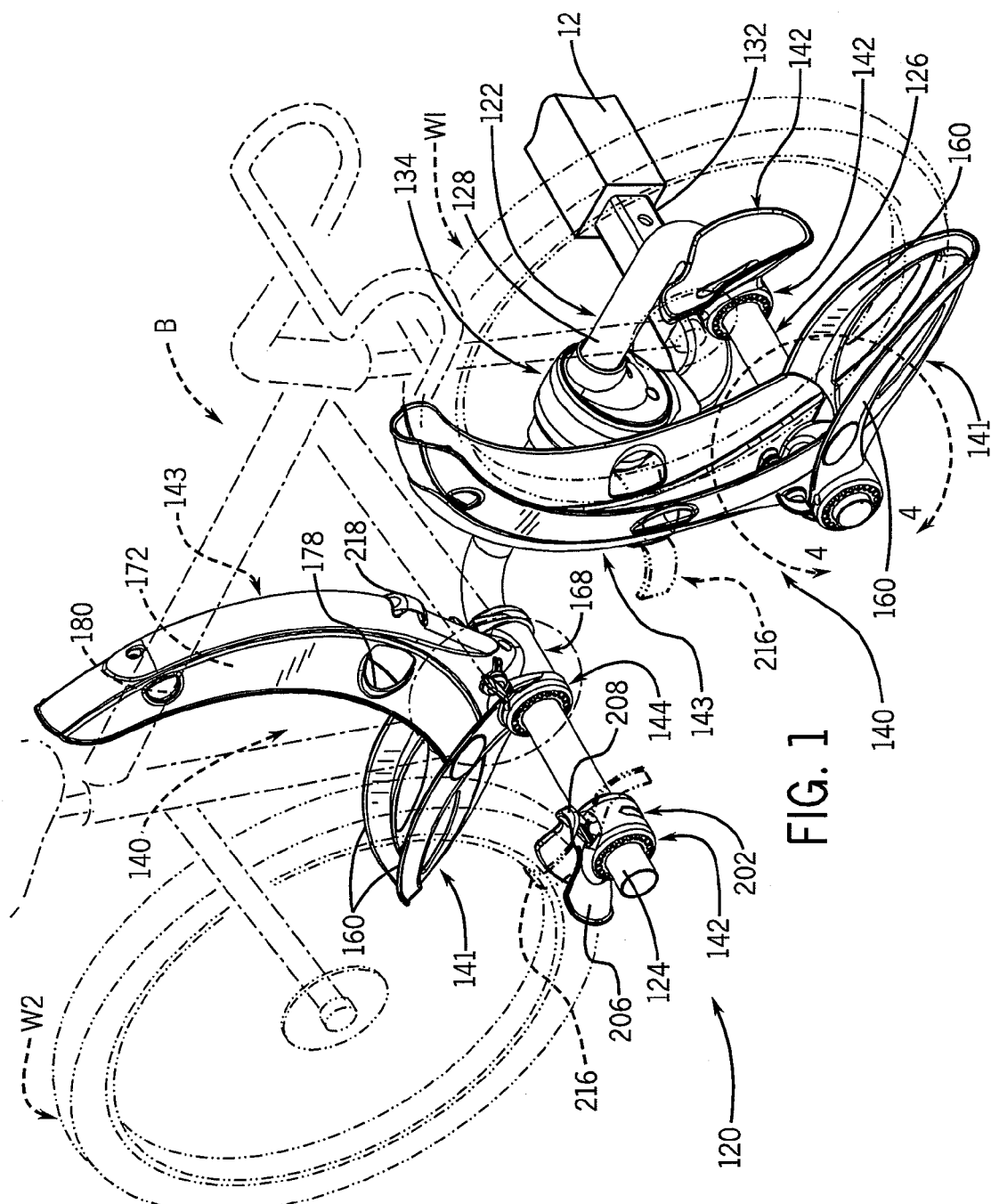
FIG. 1 is an isometric view of a support arrangement for a pair of wheeled devices, such as bicycles, in accordance with the present invention, showing the wheel engagement members in a laterally facing support position.
Figure 3:
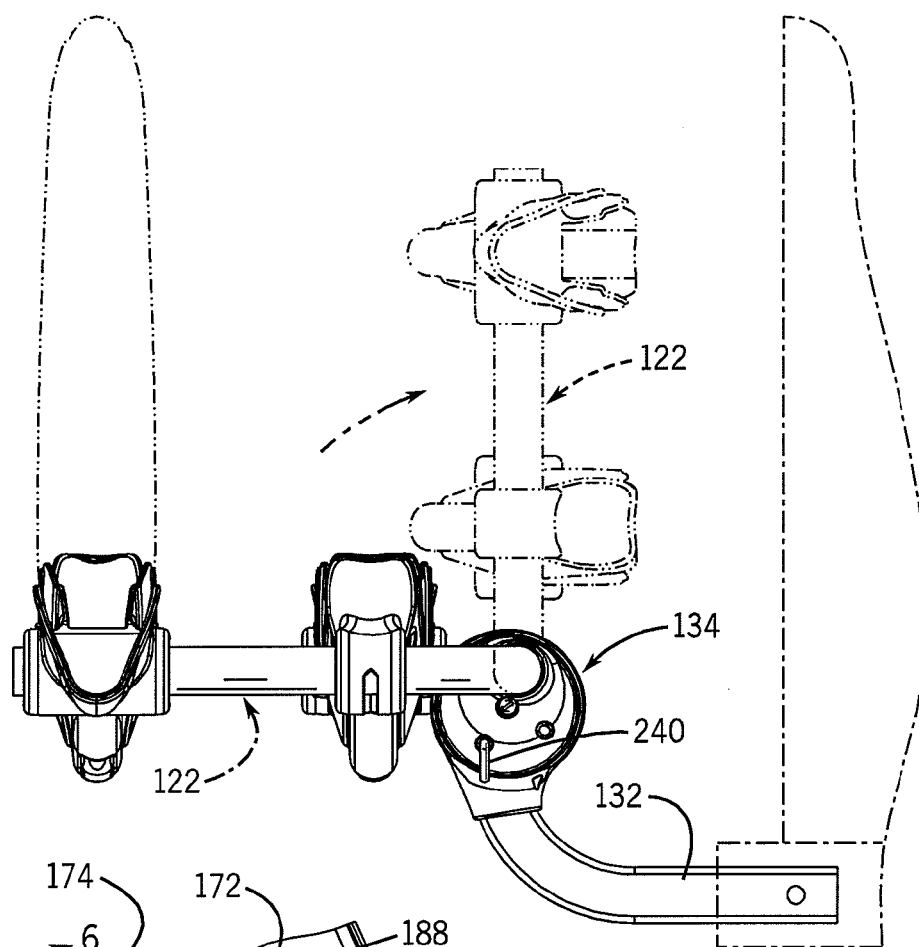
FIG. 3 is a side elevation view of the wheeled device support of FIG. 2.

Referring to FIG. 1, a support 120 for one or more wheeled devices, such as a bicycle B having a pair of wheels W1 and W2, generally includes a frame 122 having a pair of arms 124, 126. In the illustrated embodiment, frame 122 is in the form of a U-shaped member, although it is understood that any other frame configuration may be employed. In the illustrated application, frame 122 is incorporated in a bicycle carrier 130 adapted for mounting to a vehicle. Carrier 130 may include a bar 132 configured to be received within the passage of a vehicle-mounted hitch receiver R, or any other satisfactory vehicle mounting structure. Frame 122 is interconnected with the hitch-mounting bar 132 via a frame mount 134 secured to bar 132. Cross-member 128 of frame 122 may be received within a transverse passage defined by frame mount 134, and is pivotable between an operative position in which arms 124, 126 are lowered to extend horizontally, as shown in FIG. 3, and an inoperative position in which arms 124, 126 are folded and extend generally vertically, preferably upwardly as shown in phantom in FIG. 3.

A primary wheel support 140 is mounted toward the inner end of frame arm 124, and a similar primary wheel support 140 is mounted toward the outer end of frame arm 126. Primary wheel supports 40 face in opposite directions, and each includes an upwardly facing support member 141 and a pivotable wheel engagement member 143. A secondary wheel support 142 is mounted to frame arm 124 in alignment with primary wheel support 140 mounted to frame arm 126. Similarly, a secondary wheel support 142 is mounted to frame arm 126 in alignment with primary wheel support 140 mounted to frame arm 124. Together, each primary wheel support 140 and its aligned secondary wheel support 142 are operable to mount a bicycle B to frame 122.

Figure 2:
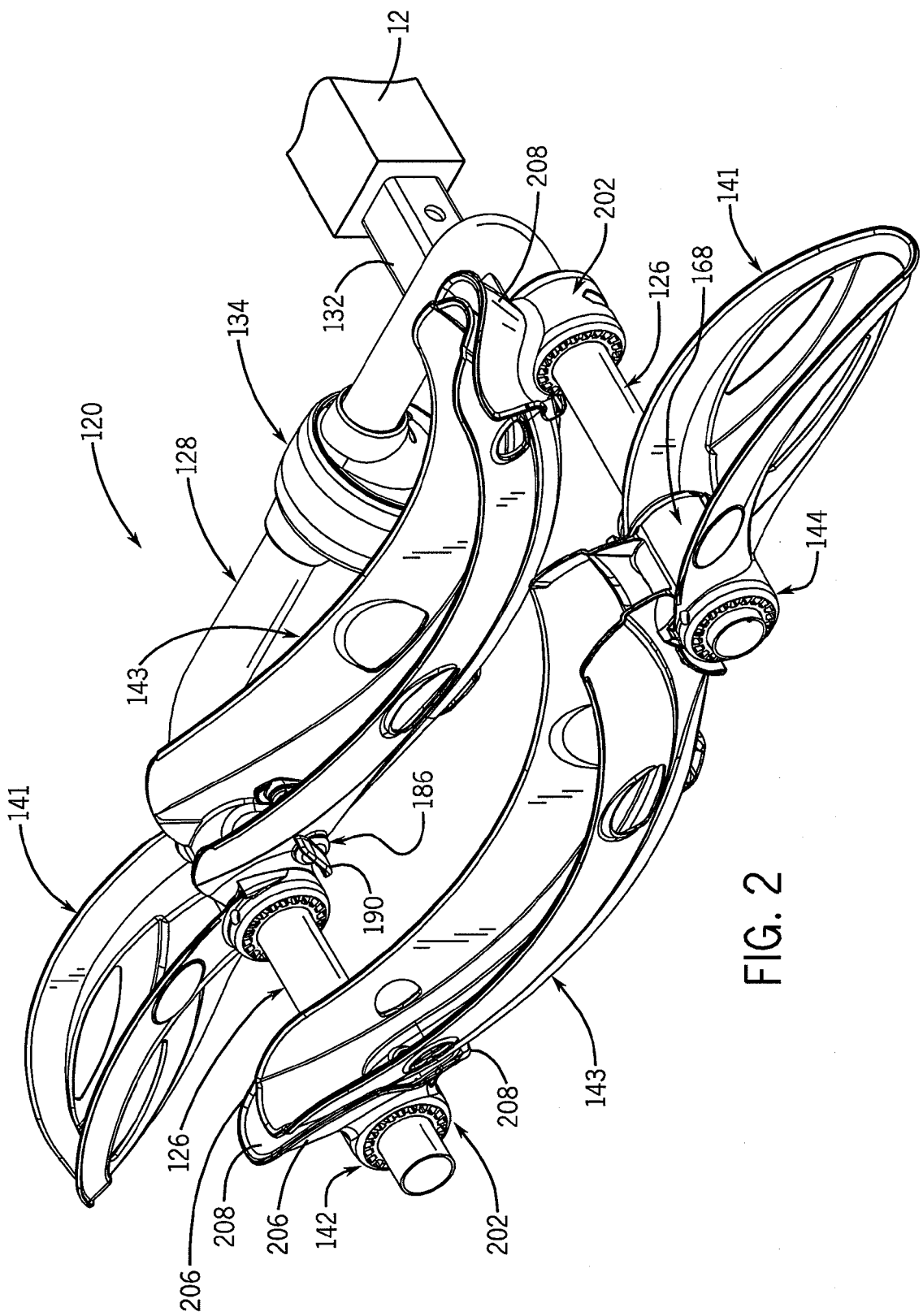
FIG. 2 is a view similar to FIG. 1, showing the wheel engagement members of the supports in an upwardly facing inoperative position.

The wheel engagement member 143 of each primary wheel support 140 is adapted for movement between a laterally facing operative support position as shown in FIG. 1 and an upwardly facing inoperative or storage position as shown in FIG. 2. The support member 141 of each primary wheel support 140 extends laterally outwardly, and is in a fixed angular position relative to the longitudinal axis of the frame arm to which the primary wheel support 140 is mounted.

Referring to FIG. 11, each support member 141 includes a pair of spaced apart hub sections 144 that define aligned passages 146, which are configured to receive the frame arm such as 126. Each hub section 144 includes a pair of diametrically aligned radial passages 148. Frame arm 126 includes a pair of diametrically aligned spaced apart sets of openings 150, which are spaced apart a similar distance as radial passages 148 in hub sections 144. Frame arm 126 is adapted to be inserted through the aligned hub section passages 146, and each set of diametrically aligned radial passages 148 in one of hub sections 144 is adapted to be positioned in alignment with one of the sets of diametrically aligned openings 150 in frame arm 126. A fastener 152 is inserted through each set of aligned hub section passages 146 and frame arm openings 150, to fix the angular position of support member 141 relative to the longitudinal axis of frame arm 126. Representatively, each fastener 152 may be in the form of a screw, the threads of which are engageable with a nut 153 fitted within a recess in alignment with one of hub section radial passages 148, in order to rigidly secure support member 141 in engagement with frame arm 126.

Figure 5:
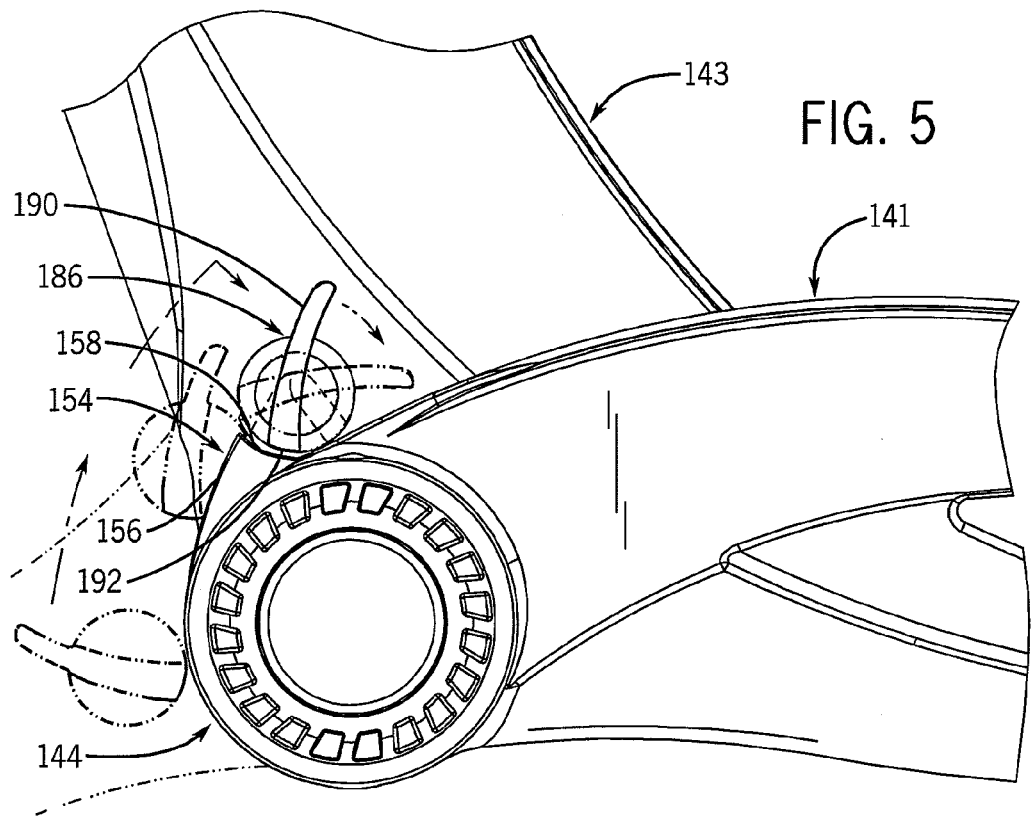
FIG. 5 is an enlarged end elevation view of the portion of the support illustrated in FIG. 4.

Each hub section 144 is formed so as to include a ramp-type latch member 154 (FIGS. 5, 11). Each ramp member 154 defines a ramp actuating surface 156 which is generally tangential to the outer surface of hub section 144, in combination with a latch engagement surface 158, the purpose of which will later be explained.

Support member 141 includes a pair of spaced apart side walls 160, each of which extends outwardly from one of hub sections 144. Side walls 160 are joined by a generally U-shaped bottom wall 162, such that side walls 160 and bottom wall 162 cooperate to form a channel or trough configuration which has an increasingly narrow width toward the outer extent of the wheel support member 141. An elongated opening 164 is formed in each side wall 160. Each side wall 160 has an upwardly curved upper edge that extends from one of hub sections 144 and first curves upwardly and then downwardly to terminate at the end of support member 141. Conversely, bottom wall 162 has a configuration that curves downwardly from hub sections 144 and then upwardly to the end of support member 141.

Wheel engagement member 143 includes a hub member 168, which has a length that enables hub member 168 to be received between the facing inner surfaces of support member hub sections 144. Hub member 168 defines a passage 170, which is adapted to receive the frame arm, such as 126, when frame arm 126 is inserted through hub section passages 146 of support member 141. In this manner, wheel engagement member 143 is pivotable on frame arm 126 about a pivot axis coincident with the longitudinal axis of frame arm 126. Wheel engagement member 143 is pivotable between an upwardly extending, laterally facing support or engagement position as shown in FIG. 1, and a laterally extending upwardly facing inoperative or storage position as shown in FIG. 2. Each wheel engagement member 143 is in the upwardly extending, laterally facing support position for use in mounting a bicycle to support 120. Each engagement member 143 is in the inoperative or storage position when a bicycle is not engaged with the primary wheel support 140.

Each wheel engagement member 143 is formed with a pair of curved side walls 172, which are joined by a U-shaped bottom wall 174. Side walls 172 and bottom wall 174 cooperate to form an arcuate or curved channel or trough configuration, which has an increasingly narrow width toward the outer extent of the wheel engagement member 143.

Figure 6:
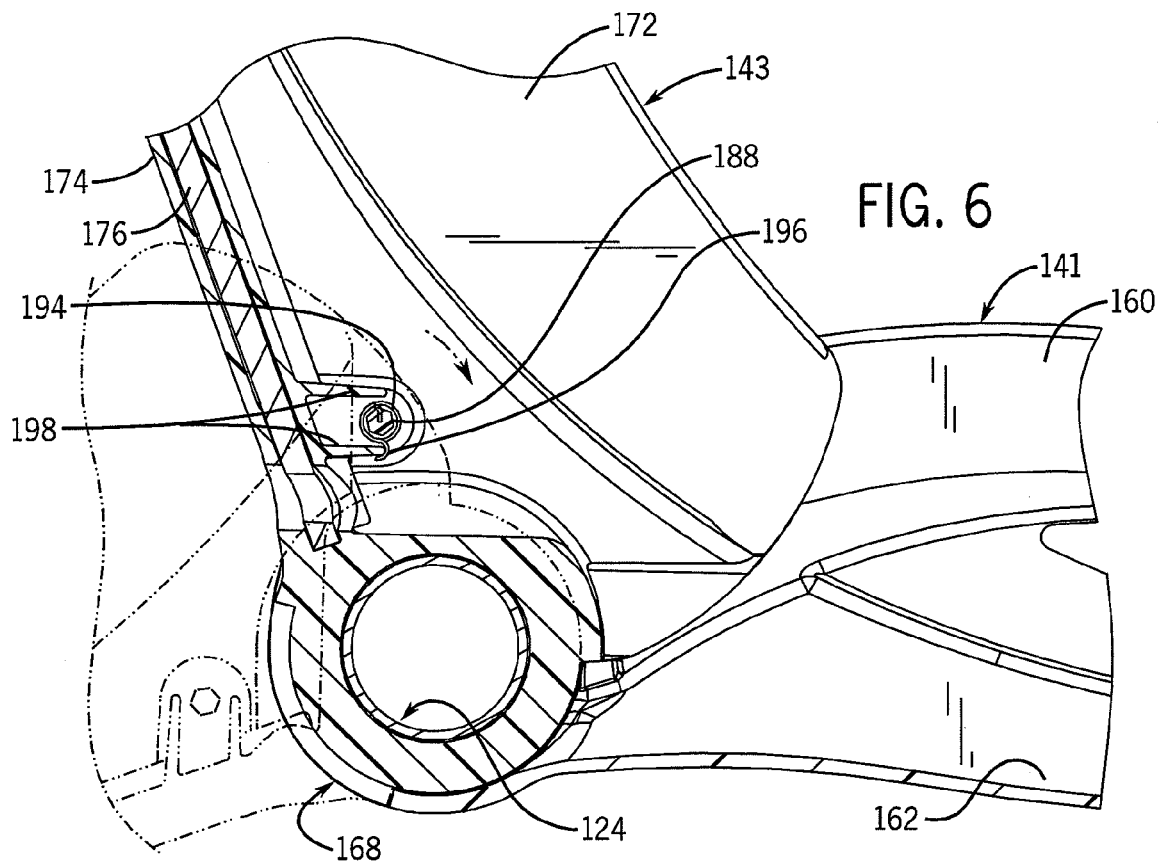
FIG. 6 is a partial section view taken along line 6-6 of FIG. 4.
Figure 7:
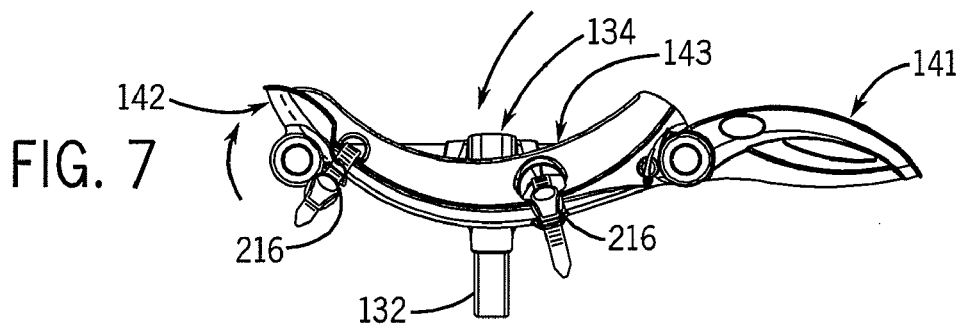
FIG. 7 is an end elevation view of the carrier of FIG. 1, showing the wheel engagement member in the upwardly facing inoperative position as in FIG. 2.

Referring to FIG. 6, bottom wall 174 of wheel engagement member 143 incorporates a stiffener 176. In the illustrated embodiment, stiffener 176 is in the form of an arcuate, curved metal strip that is embedded within the material of bottom wall 174. Representatively, bottom wall 174 may be injection molded, and stiffener 176 is insert molded into the material of bottom wall 174 during molding to stiffen and strengthen wheel engagement member 143.

Side walls 172 are formed with aligned D-shaped openings 178 at approximately the midpoint along the length of wheel engagement member 143. A smaller set of aligned D-shaped openings 180 are formed in side walls 172 toward the outer end of wheel engagement member 143.

Figure 4:
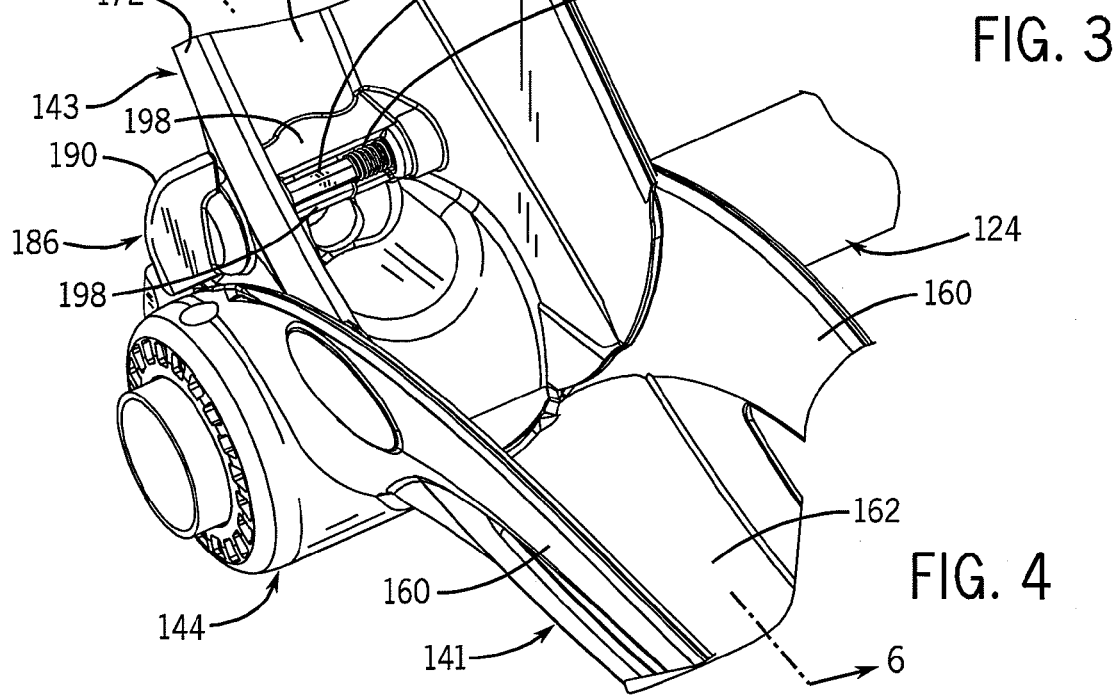
FIG. 4 is an enlarged partial isometric view of a portion of the wheeled device support of FIG. 1, with reference to line 4-4 of FIG. 1.

Referring to FIGS. 4, 6 and 11, a pair of aligned mounting bosses 182 are located adjacent hub member 168. Mounting bosses 182 define aligned passages 184. A pair of latch members 186 are positioned such that each latch member 186 is located in alignment with and outwardly of one of mounting bosses 182. Each latch member 186 is secured to the end of a shaft 188. In the illustrated embodiment, shaft 188 has a non-circular cross section, such as a hexagonal cross section, and each latch member 186 includes a mating recess within which one end of shaft 188 is received. Each latch member 186 includes a transversely oriented wing section 190, which defines an inwardly facing engagement surface 192.

Shaft 188 extends through a passage defined by a torsion spring 194. One end of torsion spring 194 includes a hook 196 that engages the end of an outwardly extending wall 198, which forms a recess within which shaft 188 is received. The opposite end of torsion spring 194 is engaged with the shaft 188, or with one of latch members 186. In this manner, torsion spring 194 functions to torsionally bias latch members 186 toward a predetermined rotational position relative to wheel engagement member 143. With this construction, when wheel engagement member 143 is in the upright support position as in FIG. 1, engagement surfaces 192 of latch member wing sections 190 are in close proximity to latch engagement surfaces 158 on support member hub sections 144. With latch members 186 in this position, the engagement between latch member engagement surfaces 192 and latch engagement surfaces 158 functions to maintain wheel support member 143 in the upright support position. When it is desired to lower wheel support member 143, one of latch members 186 is rotated to the phantom line position as shown in FIG. 5, to move engagement surfaces 192 out of alignment with latch engagement surfaces 158. Wheel engagement member 143 can then be lowered to the inoperative or storage position as shown in FIG. 2. When the wheel engagement member 143 is again raised, the engagement surfaces 192 of latch members 186 move along actuating surfaces 156 of latch members 154. Such movement of latch members 186 causes latch members 186 to rotate against the biasing force of torsion spring 194. When wheel engagement member 143 is in the upright support position, the latch member engagement surface 192 clears the end of actuating surface 156, and latch members 186 are then rotated under the influence of torsion spring 194 to move engagement surfaces 192 into alignment with latch engagement surfaces 158, to maintain wheel support member 143 in the upright support position.

Secondary wheel support 142 includes a hub member 202 that defines a passage 204 within which frame arm 124 is received. Hub member 202 carries a short, arcuate trough-type support including a pair of side walls 206 joined by a U-shaped bottom wall 208. At one end, side walls 208 terminate inwardly of bottom wall 208, such that a portion of bottom wall 208 extends from side walls 206.

Secondary wheel support 142 is pivotable on frame arm 124. Referring to FIG. 13, frame arm 124 includes an outwardly extending pin 210. The wall of hub member 202 defining passage 204 is formed with arcuate recesses 212 within which the ends of pin 210 are received, in order to maintain the axial position of secondary wheel support 142 on frame arm 124. Recesses 212 enable secondary wheel support 142 to be pivoted or rotated on frame arm 124, and the ends of recesses 212 define the range of rotational movement of secondary wheel support 142. In the illustrated embodiment, recesses 212 enable secondary wheel support 142 to be rotated approximately 90° on frame arm 124.

Wheel engagement member 143 and secondary wheel support 142 each carry ratchet-type straps 216. Wheel engagement member 143 includes a strap retainer 218, which cooperates with the outer surface of bottom wall 174 to define a passage through which strap 216 extends. Strap 216 includes spaced apart resilient keepers 220, which engage the edges of retainer 218 so as to maintain strap 216 in position on wheel engagement member 143. Secondary wheel support bottom wall 208 includes a transverse slot 222 through which strap 216 extends. Again, the keepers 220 of strap 216 maintain strap 216 in engagement with secondary wheel support 142.

Figure 16:
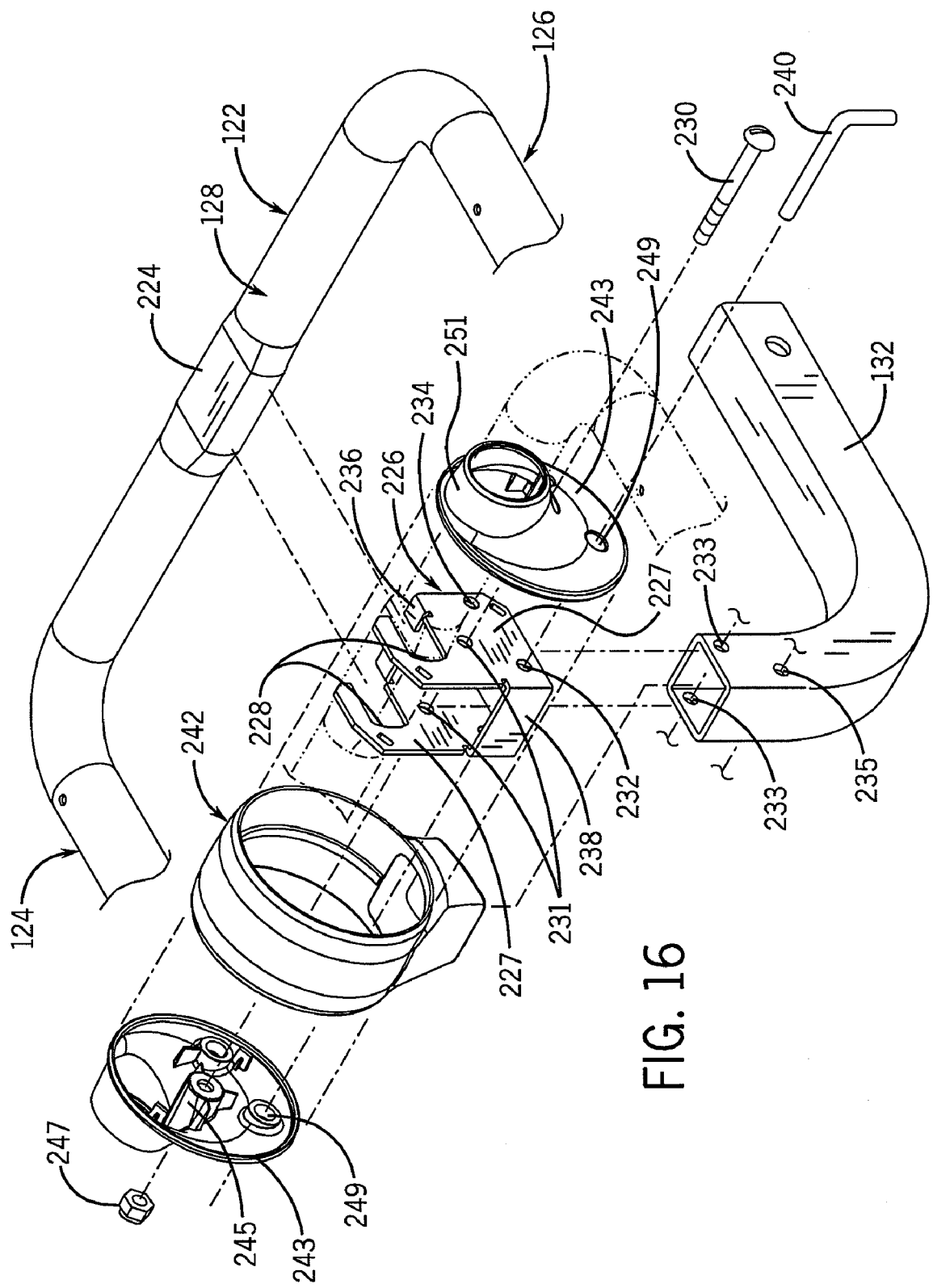
FIG. 16 is a partial exploded isometric view illustrating the components of the mounting arrangement that provides movement of the support of FIG. 1 between the raised, vertical inoperative position and the lowered, horizontal operative position.
Figure 17:
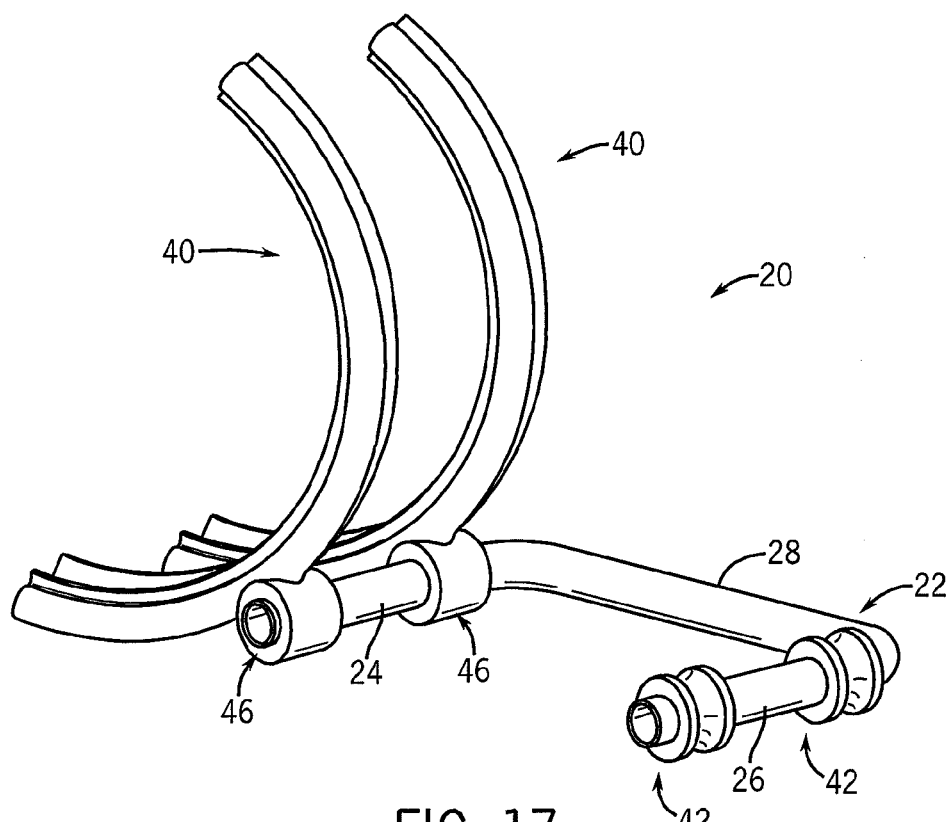
FIG. 17 is an isometric view of another embodiment of a wheeled device support in accordance with the present invention.
Figure 18:
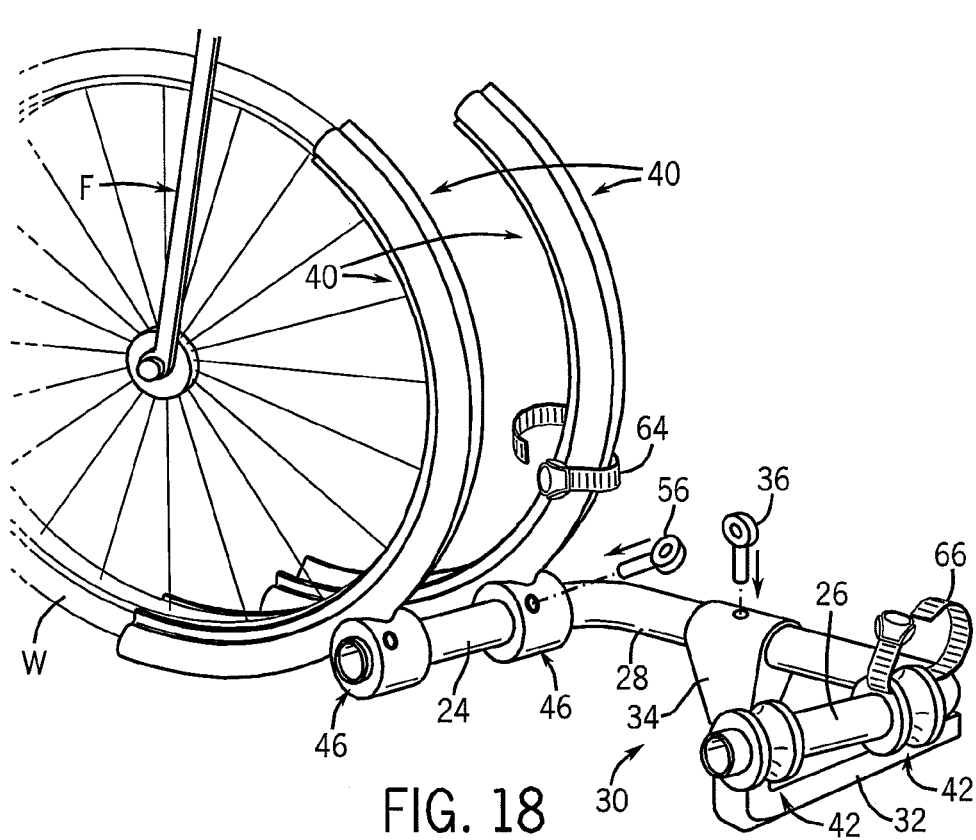
FIG. 18 is an isometric view similar to FIG. 17, showing the wheeled device support for use in a vehicle-mounted configuration.
Figure 19:
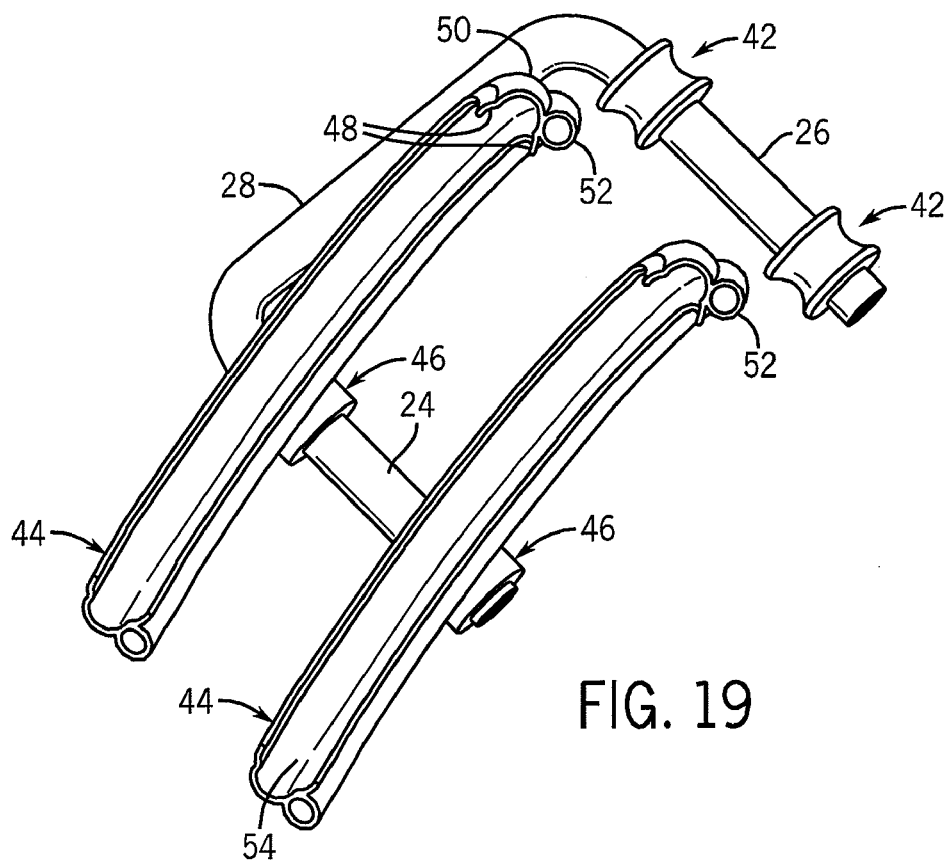
FIG. 19 is a top plan view of the wheeled device support of FIGS. 17 and 18.
Figure 20:
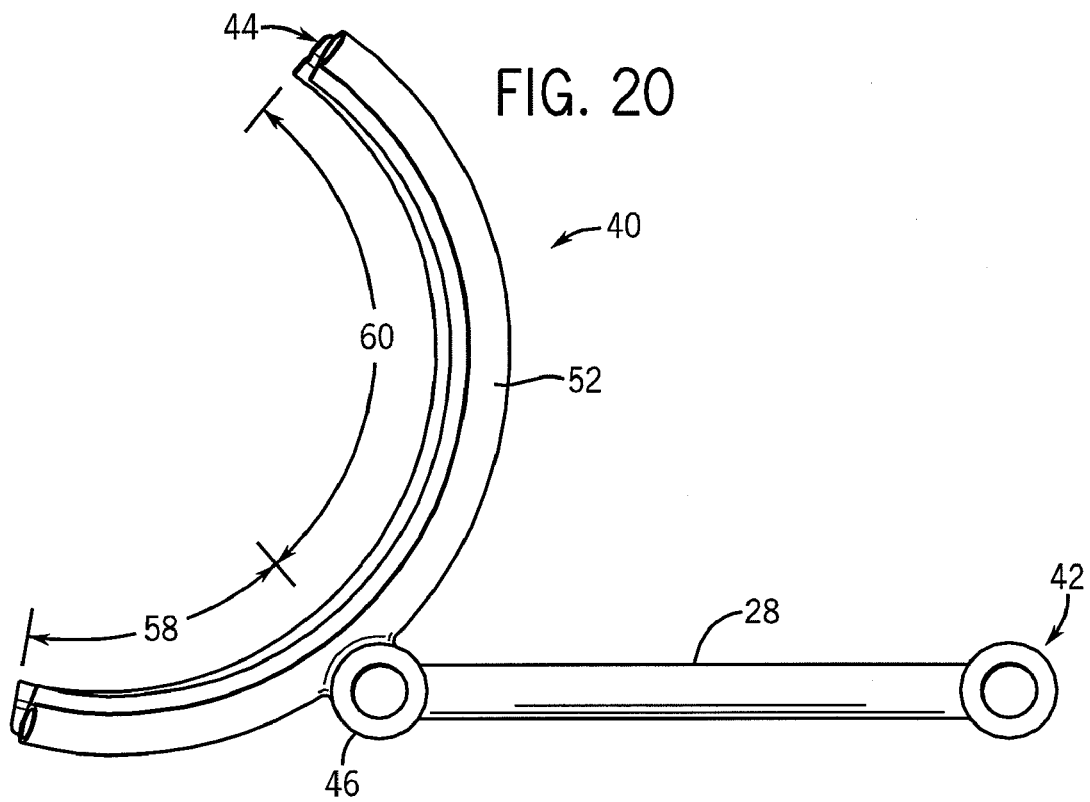
FIG. 20 is an end elevation view of the wheeled device support of FIGS. 17-19.
Figure 21:
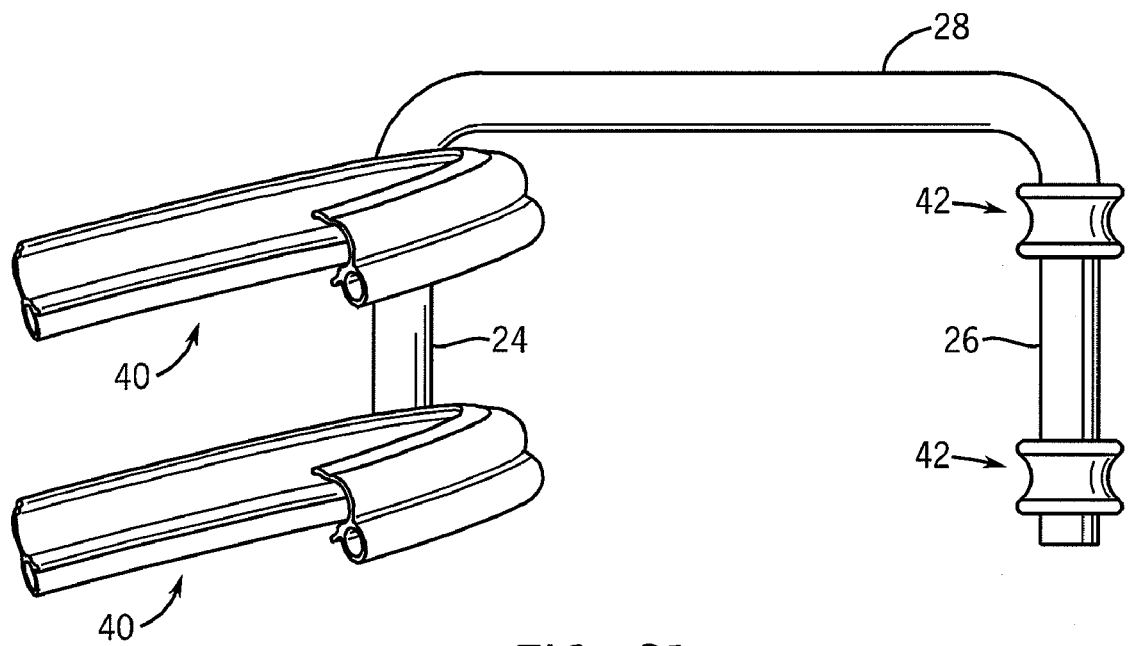
FIG. 21 is a view similar to FIG. 19, showing the wheel engagement members in the support position.
Figure 22:
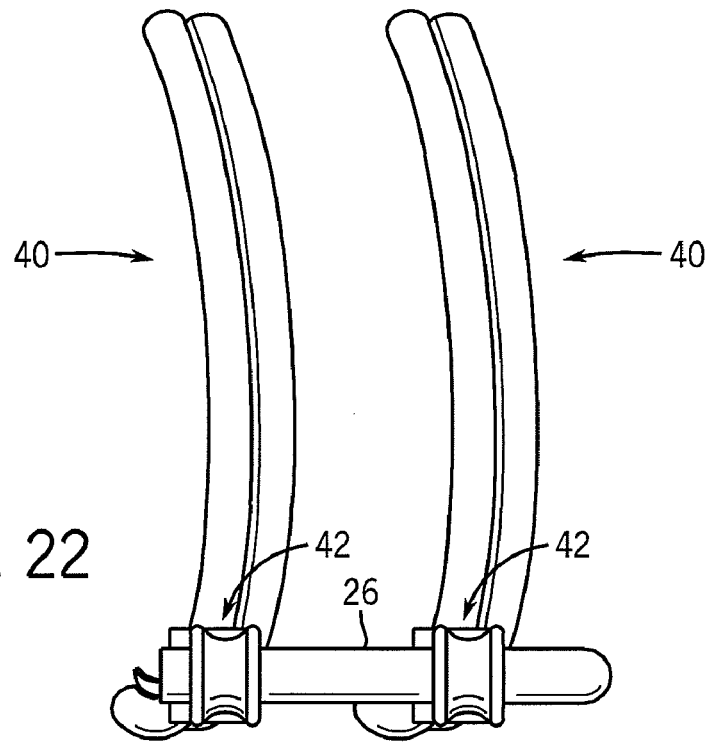
FIG. 22 is a side elevation view of the wheeled device support as in FIG. 21.
Figure 23:
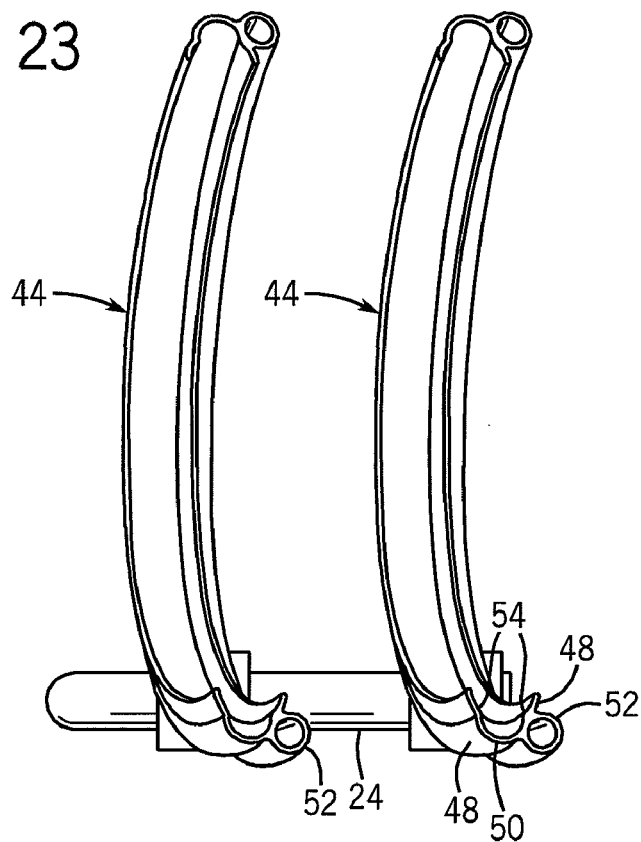
FIG. 23 is a view similar to FIG. 22, showing an opposite side elevation view.
Figure 24:
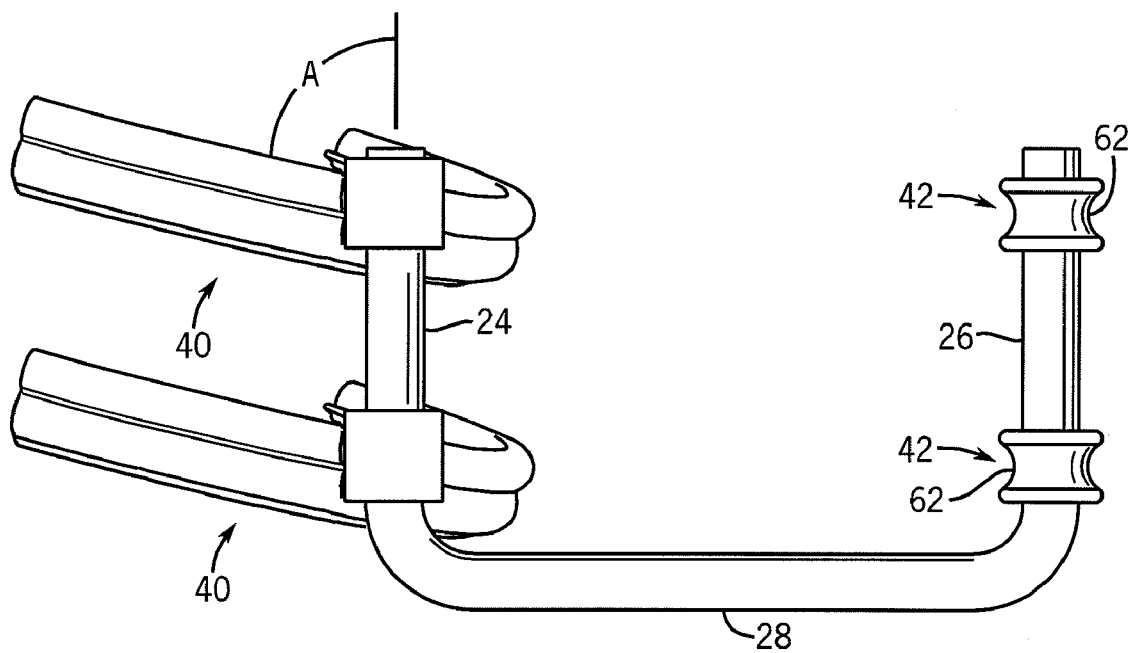
FIG. 24 is a bottom plan view of the wheeled device support as in FIGS. 21-23.
Figure 25:
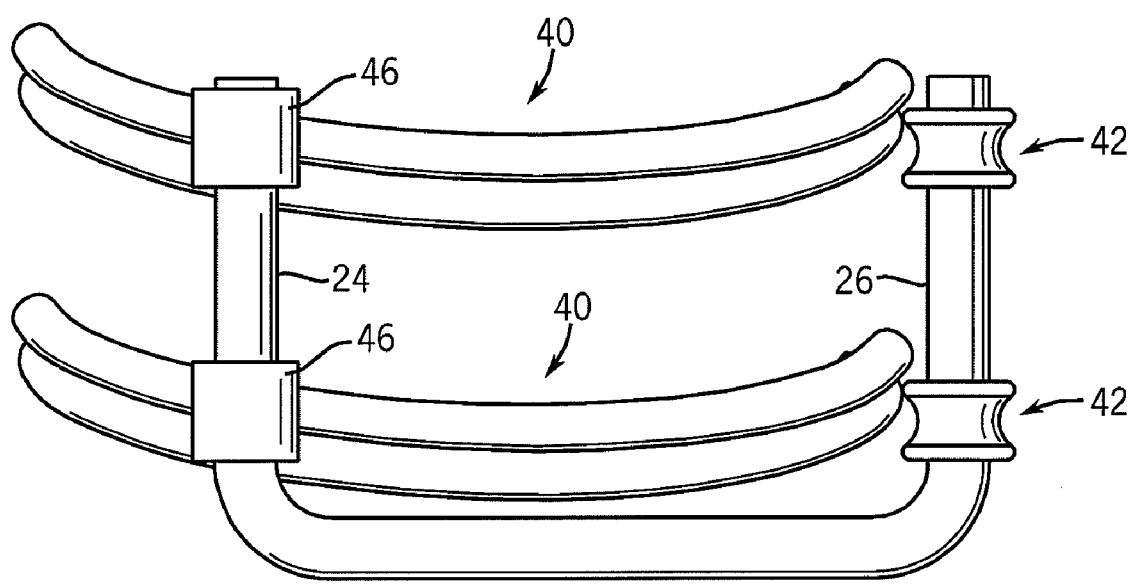
FIG. 25 is a bottom plan view of the wheeled device support with the wheel engagement members in the upwardly facing inoperative position.

Frame 122 is rotatably engaged with frame mount 134 in a manner that enables frame 122 to be moved between a lowered, horizontally extending operative position and a raised, vertically extending inoperative or storage position. Referring to FIG. 3, the lowered, horizontally extending operative position of frame 122 is shown in solid lines, and the raised, vertically extending storage position is shown in phantom lines. As shown in FIGS. 14-16, the outer end of hitch-mounting bar 132 is bent to an angle of approximately 90 degrees relative to the inner end of bar 132, so as to extend generally vertically. Cross-member 128 of frame 122 includes a flattened central area 224. A pivot bracket 226 includes a pair of walls 227, each of which defines a recess 228 that is configured to receive central area 224 of cross-member 128. Flattened central area 224 is engaged within recesses 228, and pivot bracket 226 and cross-member 128 are rigidly secured together, such as by welding. A pivot pin 230 extends through aligned openings 231 in the side walls 227 of pivot bracket 226 and through aligned openings 233 in the walls of bar 132, to pivotably mount pivot bracket 226 to the upper end of bar 132 about a pivot axis defined by pivot pin 230.

The side walls 227 of pivot bracket 226 also are formed with a pair of retainer openings 232, 234, and the walls of bar 132 include aligned openings 235 with which retainer openings 232, 234 move into alignment upon pivoting movement of pivot bracket 226. Pivot bracket 226 also includes a pair of stops 236, 238, which are configured to selectively engage the opposite walls of bar 132. When pivot bracket 226 is positioned to place frame 122 in the horizontally extending operative position as shown in FIG. 14, stop 238 engages bar 132 so as to position openings 232 in alignment with openings 235. A retainer pin 40 is then inserted through pivot bracket openings 232 and the aligned openings in bar 132, to maintain frame 122 in the horizontally extending operative position. To move frame 122 to the vertically extending inoperative position, pin 240 is removed and an upward force is applied to frame 122 to cause pivoting movement of pivot bracket 226 about pivot pin 230. When frame 122 is in the vertically extending inoperative position, stop 236 engages bar 132 and pivot bracket openings 234 are in alignment with the aligned openings in bar 132, to maintain frame 122 in the vertically extending inoperative position.

Frame mount 134 includes a cover 242 that encloses pivot bracket 226 and the upper end of bar 132. A pair of closure side walls 243 enclose the open sides of cover 242. Each closure side wall 243 includes a boss 245 defining a passage through which pin 230 extends. Pin 230 may be in the form of a bolt or screw, including a threaded end with which a nut 247 is engaged. In this manner, pin 230 provides the dual function of pivotably securing pivot bracket 226 to bar 132 and securing closure side walls 243 in position against the outer surfaces of bracket side walls 227. Closure side walls 243 also include openings 249 that are in alignment with pivot bracket openings 232, 234, to enable pin 240 to be inserted therethrough. Closure side walls 243 also include an annular flange 251 that defines a passage through which cross-member 128 extends.

In operation, support 120 functions as follows in order to support one or more bicycles. Initially frame 122 is moved to the lowered operative position so that frame 122 extends horizontally as shown in FIG. 2. When support 120 is in the inoperative storage position as shown in FIG. 3, wheel engagement members 143 are in the lowered, inoperative position as shown in FIG. 2. In this position, the end of wheel engagement member 143 is received within the trough defined by secondary wheel support 142 in a nesting relationship. Strap 216 of secondary wheel support 142 is positioned through openings 180 of wheel engagement member side walls 172, so as to releasably secure the outer end of wheel engagement member 143 to secondary wheel support 142. When frame 122 is moved to the lowered, operative position, strap 216 is released so as to disengage wheel engagement member 143 from secondary wheel support 142.

Figure 8:
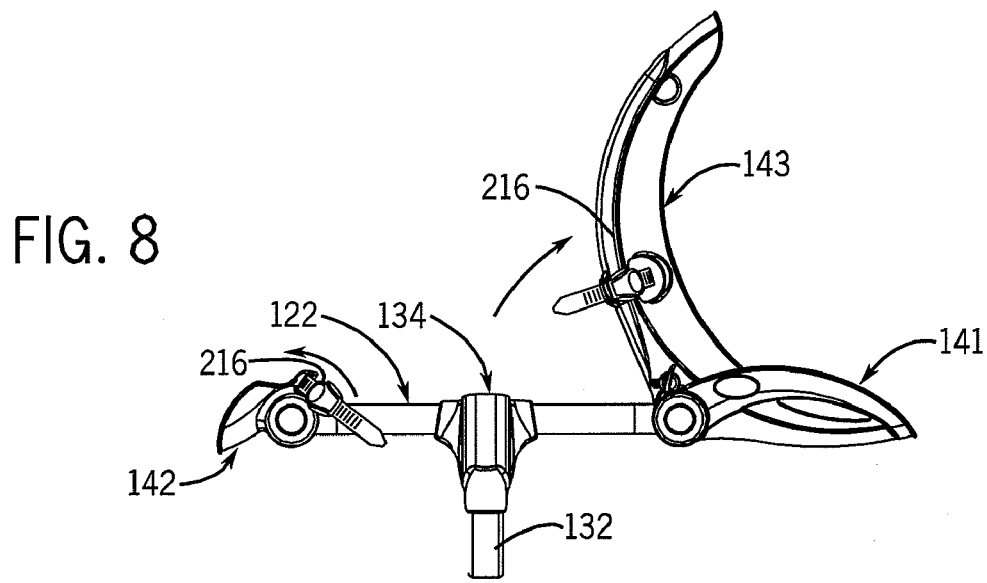
FIG. 8 is a view similar to FIG. 7, showing the wheel engagement member in the laterally facing support position as in FIG. 1.
Figure 9:
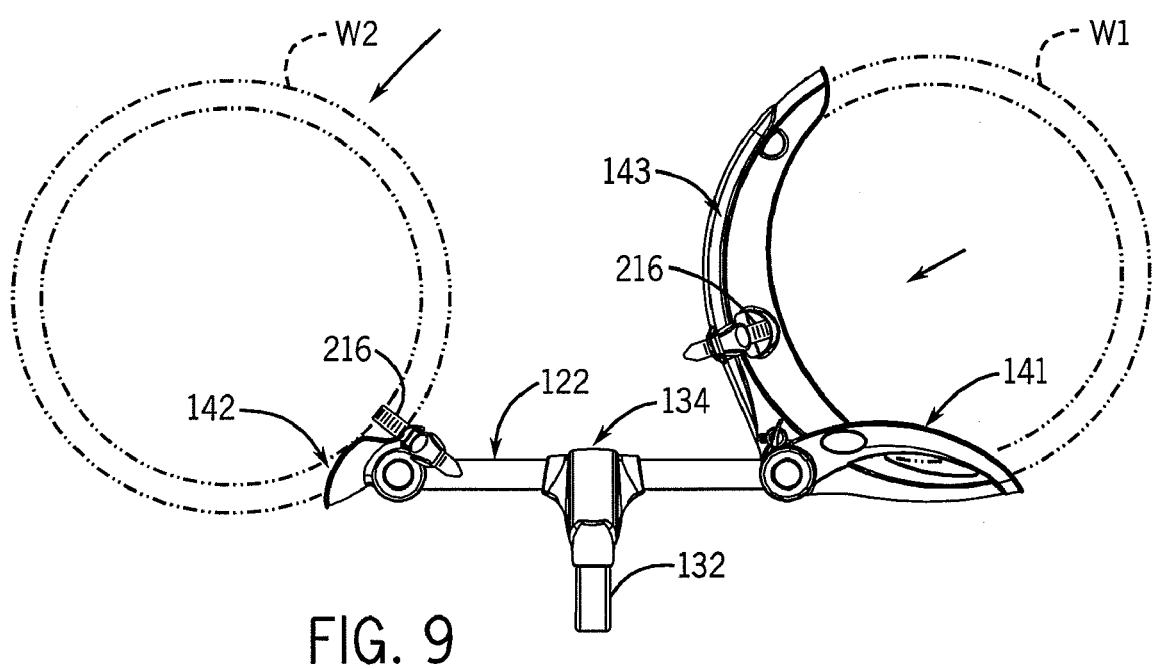
FIG. 9 is a view similar to FIG. 8, showing the wheels of a wheeled device, such as a bicycle, engaged with the support.

As shown in FIG. 8, the user then pivots or rotates wheel engagement member 143 upwardly toward the raised, operative position, which causes wheel engagement member 143 to pivot or rotate about the longitudinal axis of the frame arm 124 or 126 to which the wheel engagement member 143 is mounted. As wheel engagement member 143 is pivoted or rotated upwardly, latch members 186 move along actuating surfaces 156, as noted previously, which causes rotation of shaft 188 against the biasing force of torsion spring 194. As wheel engagement member 143 reaches the upright, laterally facing support position, latch member engagement surfaces 192 clear the end of actuating surface 156, and latch members 186 are pivoted or rotated under the influence of torsion spring 194 so as to move latch member engagement surfaces 192 into alignment with latch engagement surfaces 158 of latch members 154. Latch members 186 thus maintain wheel engagement member 143 in the upright support position. The user then pivots or rotates secondary wheel support 142 about the frame arm 124 or 126 to which the secondary wheel support 142 is mounted, so that the trough of secondary wheel support 142 faces away from primary wheel support 140. The user then moves bicycle B into engagement with primary wheel support 140 and secondary wheel support 142 as shown in FIG. 9, by placing bicycle wheel W1, which preferably is the front or steering wheel of the bicycle B, into engagement with primary wheel support 140 and bicycle wheel W2 into engagement with secondary wheel support 142. Bicycle wheel W1 is engaged with primary wheel support 140 such that support member 141 underlies the lowermost area of bicycle wheel W1 and wheel engagement member 143 receives and extends about a side area of bicycle wheel W1. Support member 141 and wheel engagement member 143 are configured to receive over one-quarter of the circumference of bicycle wheel W1, but less than half of the bicycle wheel circumference. Primary wheel support 140 can accommodate different sizes of bicycle wheel W1, by allowing the lower extent of bicycle wheel W1 to be rolled within support member 141 so that the inner area of the bicycle wheel W1 comes into contact with wheel engagement member 143. The user then operates strap 216 so as to extend strap 216 through openings 178 over the rim of bicycle wheel W1. Strap 216 is then tightened so as to firmly engage bicycle wheel W1 with the area of wheel engagement member 143 adjacent opening 178.

The user then positions secondary wheel support 142 so as to receive the bicycle wheel W2, within the range of positions allowed by movement of pin 210 within recesses 212. Bicycle wheel W2 is then engaged between side walls 206 and with bottom wall 208 of secondary wheel support 142, and the strap 216 of secondary wheel support 142 is then wrapped about the rim of wheel W2. Strap 216 is then tightened so as to force the outer area of bicycle wheel W2 against side walls 206 and bottom wall 208, so as to securely mount bicycle wheel W2 to secondary wheel support 142.

With the above-described construction, it can be appreciated that bicycle B can be quickly and easily engaged with support 120 by engagement of bicycle wheels W1 and W2 with primary and secondary wheel supports 140, 142, respectively. Once bicycle wheel W1 is engaged with primary wheel support 140, bicycle B is self-supported so that the user's hands are free to position secondary wheel support 142 and to engage straps 216 with the bicycle wheel rims. Primary and secondary wheel supports 140, 142, respectively, function to secure bicycle B to support 120 without engagement with the frame of bicycle B.

When it is desired to disengage bicycle B from support 120, the user releases straps 216 so that bicycle B is supported simply by engagement of bicycle wheels W1 and W2 with primary and secondary supports 140, 142, respectively. The user then lifts bicycle B so as to remove bicycle wheel W1 from primary wheel support 140 and bicycle wheel W2 from secondary wheel support 142. The user then rotates latch members 186 by turning the wing section 190 of one of latch members 186, against the force of torsion spring 194, so as to move engagement surface 192 of latch members 186 out of alignment with latch engagement surfaces 158 of latch members 154. Wheel engagement member 143 is then rotated or pivoted downwardly. Wheel support 142 is pivoted so as to be positioned to receive the outer end of wheel engagement member 143, as shown in FIG. 2. Strap 216 of secondary wheel support 142 is then passed through the openings 180 and engaged, so as to maintain wheel engagement member 143 in the lowered, inoperative position. Support 120 can be transported with engagement members 143 in the lowered, inoperative position, with frame 122 either in the lowered, operative position or in the raised, inoperative position.

FIGS. 17-20 illustrate another embodiment of a bicycle support in accordance with the present invention. In this embodiment, a bicycle support 20 generally includes a frame 22 having a pair of arms 24, 26 and a cross-member 28 that extends between and interconnects arms 24, 26. In the illustrated embodiment, frame 22 is in the form of a U-shaped member although it is understood that any other frame configuration may be employed. In the illustrated application, frame 22 is incorporated in a bicycle carrier 30 adapted for mounting to a vehicle. Carrier 30 may include a bar 32 configured to be received within the passage of a vehicle-mounted hitch receiver or any other satisfactory vehicle mounting structure, and frame 22 is interconnected with the hitch-mounting bar 32 via a frame mount 34 secured to bar 32. Cross-member 28 of frame 22 may be received within a transverse passage defined at the upper end of frame mount 34, and may be pivotable between an operative position in which arms 24, 26 are raised so as to extend horizontally, and an inoperative position in which arms 24, 26 are folded and extend generally vertically, either downwardly or upwardly. A pin 36 extends through an opening in frame mount 34 and into aligned passages or openings in cross-member 28, for selectively retaining frame 22 in either the raised, operative position or the lowered, inoperative position.

A pair of trough-type wheel supports 40 are mounted to frame arm 24, and a pair of bumper-type wheel supports 42 are mounted to frame arm 26. In a manner to be explained, trough wheel supports 40 and bumper wheel supports 42 are operable to mount a pair of bicycles to frame 22.

Each trough wheel support 40 includes an elongated trough member 44 and a mounting sleeve 46. In the illustrated embodiment, trough member 44 and mounting sleeve 46 are formed integrally, although it is understood that any other satisfactory construction may be employed. Representatively, trough member 44 and mounting sleeve 46 may be formed of a thermoplastic material in an injection molding process, although it is understood that any other satisfactory material and forming method may be employed.

Each trough member 44 is in the form of an arcuate channel having side walls 48 and a bottom wall 50, in combination with an arcuate tubular section 52 that is formed integrally with one of side walls 48. Tubular section 52 and the adjacent area of bottom wall 50 and one of side walls 48 are formed integrally with mounting sleeve 46. Trough member side walls 48 have a stepped configuration, defining a narrow width adjacent bottom wall 50 and a greater width at the inner periphery of trough member 44. The stepped configuration of each trough member side wall 48 is defined by a U-shaped portion formed by bottom wall 50 and the adjacent area of each side wall 48, in combination with an outwardly flared outer area that forms a ridge 54 extending along the length of each side wall 48. Tubular section 52 provides reinforcement and rigidity to each trough member 44.

Each trough member 44 lies in a plane that is non-perpendicular relative to its associated mounting sleeve 46. That is, each mounting sleeve 46 defines an axially-extending passage within which arm 24 is received, and the sleeve axis and the plane of each trough member 44 form a non-perpendicular angle, represented at A in the drawings.

Each trough member 44 extends along a radius that corresponds with the diameter of a bicycle wheel associated with a bicycle adapted for engagement with bicycle support 20, so that the trough member 44 engages the bicycle wheel along a portion of the circumference of the bicycle wheel corresponding to the length of the trough member 44. Trough member 44 has a length that is less than one-half of the circumference of the bicycle wheel, so that the bicycle wheel can be moved into and out of engagement with the channel section of the trough member 44. Representatively, trough member 44 may have a length corresponding to 40-45% of the bicycle wheel circumference.

A selectively engageable pin or key 56 extends through aligned transverse openings in each mounting sleeve 46 and arm 24, to maintain each trough member 44 in an upright position relative to arm 24. In the upright position, each trough member 44 generally defines two sections located one on either side of mounting sleeve 46, i.e. an upwardly facing section denoted at 58 and a laterally facing section denoted at 60. Trough member 44 has a length sufficient to position the outer end of upwardly facing section 58 past the lowermost point of the bicycle wheel, and the end of laterally facing section 60 past the innermost point of the bicycle wheel.

Pin or key 56 may be removed from engagement from mounting sleeve 46 and arm 24, which enables each trough wheel support 40 to pivot relative to arm 24. In this manner, each trough wheel support 40 can be pivoted so that its section 60 faces upwardly in a receiving position, in which a user is able to place the bicycle wheel into engagement with the trough wheel support 40. Section 60 has a length that enables the end of section 60 to rest on its associated bumper wheel support 42, to maintain the trough wheel support 40 in the receiving position.

Bumper wheel supports 42 are fixed to arm 26, and each defines a peripheral depression or groove 62, which has a radius configured to enable a bicycle wheel to be received therewithin.

Each trough wheel support 40 includes a retainer strap 64 and each bumper wheel support 42 includes a retainer strap 66. Retainer straps 64 and 66 are schematically illustrated, and are secured to trough wheel supports 40 and bumper wheel supports 42, respectively, in any satisfactory manner. For example, each wheel support may include a transversely extending channel within which the retainer strap is received. The retainer strap may include any satisfactory releasable securing mechanism that enables the retainer strap to be tightened, such as a conventional ratchet-type arrangement with a selectively actuable release mechanism.

In operation, the user engages a bicycle with the bicycle support 20 by first placing the trough wheel support 40 in the receiving position by removing pin or key 56 and pivoting sleeve 46 about arm 24 so that the end of trough wheel support 40 rests on the bumper wheel support 42. The user then lifts the bicycle so that the bicycle front wheel, shown at W, is at an elevation slightly above the trough wheel support 40 and in the plane defined by the trough member 44. When lifting and positioning the bicycle in this manner, the user is able to position his or her body between arms 24 and 26, so that the bicycle can be lifted without difficulty close to the user's body. The user then moves the bicycle front wheel W into the channel section of the trough member 44, so that the bicycle wheel is received between the side walls 48. The user then moves the bicycle forwardly while maintaining front wheel W in engagement with trough wheel support 40, which pivots the trough wheel support 40 upwardly by pivoting movement of sleeve 46 on arm 24. The movement of the bicycle functions to bring the bicycle rear wheel into engagement with the bumper wheel support 42 within the groove 42. The user then repositions pin or key 56 into engagement with sleeve 46 and arm 24, to retain trough wheel support 40 in the upright position.

When the front bicycle wheel W is engaged with the trough wheel support 40, the upper end of the trough wheel support 40 is located rearwardly of the bicycle fork, shown at F. The lower end of the trough wheel support 40 is located slightly rearwardly of the longitudinal axis of the bicycle fork F extended, which illustrates that bicycle wheel support 40 covers just less than half the circumference of bicycle wheel W.

Trough wheel support 40 and bumper wheel support 42 are configured and positioned so that the bicycle is held upright when the bicycle front wheel is engaged with trough wheel support 40 and the bicycle rear wheel rests on bumper wheel support 42. The user then tightens straps 64 and 66 onto the front and rear wheels, respectively, to positively maintain the bicycle wheels in engagement with the wheel supports and to prevent the bicycle from becoming disengaged with the bicycle wheel supports during transport. The user is then able to support another bicycle using the remaining trough wheel support 40 and bumper wheel support 42, in the same manner. When adjacent bicycles are supported on bicycle support 20, the orientation of trough members 44 is such that the front wheel of each bicycle is turned relative to the bicycle frame, due to the orientation of trough members 44 relative to mounting sleeves 46. In this manner, the handlebars of the adjacent bicycles do not contact each other, so that the bicycles can be positioned closely adjacent each other on frame 22.

The stepped configuration of trough members 44 enables bicycle wheels of different widths to be engaged with the trough member 44. That is, wider bicycle wheels can be engaged with the trough member 44 outwardly of ridge 54, and narrower bicycle wheels are engaged with the trough member 44 inwardly of the ridge 54 for engagement with the trough member bottom wall 50.

While the drawings show two sets of wheel supports 40 and 42 mounted to frame 22, it should be understood that the invention also contemplates a single set of wheel supports or any number of wheel supports greater than two, to provide support for any number of bicycles as desired. In addition, it should be understood that the illustration of bicycle support 20 on a bicycle carrier 30 is but one application, and that the same type of bicycle support may be used in any other application, such as for bicycle parking or display. In an application such as this, it is contemplated that the bicycle support may be used with or without the bumper wheel supports 42.

In addition, the U-shaped configuration of the frame 22 enables the user to hold the carrier 30 near its center of mass when installing the carrier 30 on the vehicle, which provides easy installation of the carrier on the vehicle.

Various other features, objects and advantages of the invention will be made apparent from the following description taken together with the drawings.

I claim:

1. A support for a bicycle having first and second bicycle wheels, wherein each wheel lies in a plane, comprising:
    a support frame;
    a first wheel engagement member pivotably mounted to the support frame at a first location for movement about a pivot axis between a loading position and a support position, wherein the first wheel engagement member defines a wheel engagement surface that is configured to engage a portion of an outer periphery defined by the first bicycle wheel, wherein the first wheel engagement member is configured and arranged to maintain engagement of the first bicycle wheel during movement of the first wheel engagement member from the loading position to the support position;
    wherein the first wheel engagement member is configured and arranged such that the wheel engagement surface of the first wheel engagement member faces upwardly and underlies a lower area of the first bicycle wheel when the first wheel engagement member is in the loading position, and faces laterally and engages a side area of the first bicycle wheel when the first wheel engagement member is in the support position, wherein the first wheel engagement member is movable in the plane of the first wheel during movement between the loading position and the support position; and
    a second wheel engagement member mounted to the support frame at a second location spaced from the first location, wherein the second wheel engagement member is configured to engage the second bicycle wheel when the first wheel engagement member is engaged with the first bicycle wheel in the support position.

2. The bicycle support of claim 1, wherein the first wheel engagement member and the pivot axis are arranged such that movement of the first wheel engagement member from the loading position to the support position functions to move the bicycle laterally.

3. The bicycle support of claim 2, further comprising a first support member interconnected with the support frame at the first location, wherein the first support member is configured to support the first bicycle wheel from below when the first wheel engagement member is in the support position.

4. The bicycle support of claim 3, wherein the first wheel engagement member comprises an arcuate trough member defining trough walls configured to receive and engage the first bicycle wheel.

5. The bicycle support of claim 1, further comprising first and second strap means for securing the first and second bicycle wheels to the first and second wheel engagement members, respectively.

6. The bicycle support of claim 1, wherein the bicycle support includes at least a pair of first wheel engagement members and a pair of second wheel engagement members, wherein the first bicycle wheel comprises the front wheel of the bicycle, and wherein each first wheel engagement member comprises an arcuate trough member defining trough walls configured to receive and engage the front bicycle wheel, and wherein each wheel engagement surface is defined by each arcuate trough member and lies in a plane that is non-perpendicular to the pivot axis so that, when front wheels of a pair of bicycles are engaged with the pair of arcuate trough members, the bicycle front wheels are turned relative to frames of the pair of bicycles to prevent contact between the handlebars of the pair of bicycles.

7. The bicycle support of claim 1, wherein the bicycle support forms a part of a vehicle-mounted bicycle carrier.

8. The bicycle support of claim 1, wherein the bicycle support forms a part of a stationary bicycle parking arrangement.

9. A bicycle support for supporting a plurality of bicycles, wherein each bicycle includes a bicycle frame, a rear wheel, a front wheel, and handlebars that pivot along with the front wheel relative to the bicycle frame, comprising:
    a support frame;
    at least a pair of front wheel supports mounted to the support frame, wherein each front wheel support is configured to engage and support the front wheel of a bicycle;
    at least a pair of rear wheel supports mounted to the support frame, wherein each rear wheel support is configured to engage and support the rear wheel of a bicycle;
    wherein the support frame, the front wheel supports and the rear wheel supports are configured to cause the bicycle front wheels to turn at an angle relative to the bicycle frames to prevent contact between the handlebars of an adjacent pair of bicycles; and
    wherein each front wheel support comprises a trough member that is pivotably mounted to the support frame for movement between an upwardly facing loading position and a laterally facing support position.

10. The bicycle support of claim 9, further comprising a first support member interconnected with the support frame at a first location, wherein the first support member is configured to support a first bicycle wheel from below when the trough member is in the laterally facing support position.

11. A bicycle support for a bicycle having first and second wheels, wherein each wheel lies in a plane, comprising:
    an arcuate trough member configured to receive and engage the first bicycle wheel, wherein the trough member includes a pivoting engagement section that is pivotable about a pivot axis while the first bicycle wheel is engaged with the arcuate tough member, from an upwardly facing receiving position in which the arcuate trough member underlies a lower portion of the first bicycle wheel, to a laterally facing support position in which the arcuate trough member engages a side area of the first bicycle wheel, wherein the trough member is movable in the plane of the first bicycle wheel during movement between the loading position and the support position; and
    a wheel support configured to support the second bicycle wheel when the trough member is in the support position.

12. The bicycle support of claim 11, wherein the trough member and the wheel support are carried by a frame configured for engagement with a vehicle.

13. The bicycle support of claim 11, wherein the trough member and the wheel support are interconnected with a stationary bicycle parking structure.

14. The bicycle support of claim 11, wherein the trough member is oriented non-perpendicular to the pivot axis so that, when the first bicycle wheel is engaged with the trough member, the first bicycle wheel is oriented in a plane that is non-perpendicular to the pivot axis.

15. The bicycle support of claim 14, wherein a plurality of trough members and wheel supports are mounted to a supporting structure to support a plurality of bicycles on the supporting structure, and wherein an orientation of the trough members orients handlebars of adjacent bicycles at an angle to prevent the handlebars of adjacent bicycles from contacting each other.

16. A bicycle support for a bicycle having first and second wheels, comprising:

an arcuate trough member configured to receive and engage the first bicycle wheel, wherein the trough member includes a pivoting engagement section that is pivotable about a pivot axis from an upwardly facing receiving position to a laterally facing support position, wherein a portion of the trough member underlies the first bicycle wheel when the trough member is in the support position; and a wheel support configured to support the second bicycle wheel when the trough member is in the support position wherein the trough member and the wheel support are configured such that a portion of the pivoting engagement section of the trough member is located adjacent the wheel support when the pivoting engagement section is in the upwardly facing receiving position, and further comprising a retainer arrangement for releasably securing the portion of the pivoting engagement section of the trough member to the wheel support.

* * * * *